(12) United States Patent
O'Brien et al.

(10) Patent No.: US 7,483,991 B2
(45) Date of Patent: Jan. 27, 2009

(54) INSTANT MESSAGING COMMUNICATIONS CHANNEL FOR TRANSPORTING DATA BETWEEN OBJECTS EXECUTING WITHIN A MANAGED CODE ENVIRONMENT

(75) Inventors: Robert R. O'Brien, Kirkland, WA (US); John T. Wilcox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 10/809,569

(22) Filed: Mar. 25, 2004

(65) Prior Publication Data
US 2005/0216594 A1 Sep. 29, 2005

(51) Int. Cl.
*G06F 15/16* (2006.01)
*G06F 15/173* (2006.01)

(52) U.S. Cl. ...................................... 709/227; 709/226
(58) Field of Classification Search ....................... None
See application file for complete search history.

(56) References Cited

U.S. PATENT DOCUMENTS

| 6,347,342 B1 * | 2/2002 | Marcos et al. | 719/315 |
| 6,976,846 B2 * | 12/2005 | Dupont et al. | 434/219 |
| 2004/0260820 A1 * | 12/2004 | Bearman | 709/229 |

OTHER PUBLICATIONS

Toub, Stephen, "Secure Your .NET Remoting Traffic By Writing An Asymmetric Encryption Channel Sink," http://mscn.microsoft.com/msdnmag/issues/03/06/NETRemoting/print.asp, © 2003 Microsoft Corporation.
"Microsoft .NET Framework FAQ," Microsoft Corporation, Jul. 2001, © 2004 Microsoft Corporation, http://msdn.microsoft.com/library/en-us/dndotnet/html/faq111700.asp....
Obermeyer, Piet; Hawkins, Jonathan, "Microsoft .NET Remoting: A Technical Overview," Microsoft Corporation, Jul. 2001, © 2004 Microsoft Corporation, http://msdn.microsoft.cmo/library/en-us/dndotnet/html/hawkremoting....
Srinivasan, Paddy, "An Introduction to Microsoft .NET Remoting Framework," Microsoft Corporation, Jul. 2001, © 2004 Microsoft Corporation, http://msdn.microsoft.com/library/en-us/dndotnet/html/introremoting....
Esposito, Dino, ".NET Remoting: Design and Develop Seamless Distributed Applications for the Common Language Runtime," © 2003 Microsoft Corporation, http://msdn.microsoft.com/msdnmag/issues/02/01NETRemoting/print.asp....

* cited by examiner

*Primary Examiner*—Ario Etienne
*Assistant Examiner*—Clayton R Williams
(74) *Attorney, Agent, or Firm*—Merchant & Gould

(57) ABSTRACT

A method, system, and apparatus for providing a communications channel for inter-object communication are provided. According to the method, a request may be received from a first object executing within a managed code environment to transmit data to a second object. In response thereto, an instant message ("IM") including the data may be transmitted to an IM server computer. The IM may be forwarded to the managed code environment in which the second object is executing. The IM may then be received by the managed code environment, the data contained therein may be extracted, and the data may be presented to the second object. A reverse path may also be utilized for return communication between objects.

17 Claims, 6 Drawing Sheets

INSTANT MESSAGING COMMUNICATIONS CHANNEL FOR TRANSPORTING DATA BETWEEN OBJECTS EXECUTING WITHIN A MANAGED CODE ENVIRONMENT

TECHNICAL FIELD

The invention generally relates to the field of distributed computing and, more specifically, to the field of communications channels for carrying data regarding distributed processing operations.

BACKGROUND OF THE INVENTION

With the advent and explosion of computer networking, many computing tasks have migrated from being performed on a two-node system (a client and a centralized server), to being performed utilizing distributed computing. Distributed computing is a programming model in which processing may occur in many different places (or nodes) around a network. Processing can occur wherever it makes the most sense, whether that is on a server, personal computer, handheld device, or other smart device.

In order to enable communication between objects in a distributed computing environment, a number of technical hurdles must be overcome. First, it is necessary for a secure asynchronous communication channel between the distributed objects to be established. However, establishing a secure asynchronous communications channel among devices across network hops and firewalls has often been a challenge. In order to be effective, the communications channel between the distributed objects should support the traversal of any number of network hops, unmanaged firewalls, network address translation ("NAT") devices, and hyper-text transport protocol ("HTTP") proxy devices. Moreover, communications from both objects should be authenticated and logged, if possible.

A number of standards do exist that enable communication between distributed objects. The distributed component object model ("DCOM") and the common object request broker architecture ("CORBA") are examples of such standards. However, these standards generally suffer from the shortcomings described above. In particular, these standards may be difficult to use in the presence of firewalls, NAT devices, and HTTP proxies. Moreover, these standards require the use of complex client and server authentication and logging configurations.

Another way of enabling communication between distributed objects is through the use of web services. Web services send and receive messages using formats and protocols that are described in a way that allows service requesters to easily find out how to make use of the service. Web services also have a number of shortcomings, however. In particular, web services do not inherently provide functionality for authenticating the client and server components that make the requests. Moreover, web services do not provide an asynchronous 2-way communications channel suitable for robust 2-way communication between distributed objects without the developer programmatically implementing custom solutions to these requirements.

It is with respect to these considerations and others that the various embodiments of the present invention have been made.

SUMMARY OF THE INVENTION

In accordance with the present invention, the above and other problems are solved by a method, system, and apparatus for providing a communications channel for inter-object communication that can operate in the presence of network hops, unmanaged firewalls, NAT devices, and HTTP proxies. Moreover, the embodiments of the invention establish a communications channel that provides an asynchronous 2-way channel for transmitting messages between distributed objects that also provides authentication and logging functionality.

According to one aspect of the invention, a method provides an instant messaging communications channel for communication between objects executing within a managed code environment. According to the method, a request may be received from a first object executing within a managed code environment to transmit data to a second object also executing within a managed code environment. A managed code environment is an execution environment in which managed code may be executed that is written to target the services of a common language runtime ("CLR").

In response to receiving a request to transmit data from a first object to a second object, an instant message ("IM") including the data may be transmitted to an IM server computer. The IM server computer is operative to execute an IM server application program that facilitates the exchange of messages between instant messaging users. Each of the objects acts as a virtual IM "buddy." According to embodiments of the invention, the message may be transmitted to the IM utilizing an IM protocol such as the MICROSOFT NETWORK PROTOCOL ("MSNP"), the MICROSOFT EXCHANGE SERVER-compatible RVP protocol ("RVP"), or the session initiation protocol ("SIP"). Because an IM protocol is utilized to transfer the message, problems with network hops, unmanaged firewalls, NAT devices, and HTTP proxies are avoided.

Once the IM has been received at the IM server computer, the IM may be forwarded to the managed code environment in which the second object is executing. The IM may then be received by the managed code environment, the data contained therein may be extracted, and the data may be presented to the second object. It should be appreciated that the first and second objects may execute within the same managed code environment on a single computer or may execute within different managed code environments executing on different and potentially remotely located computers.

According to the method, response data may also be returned from the second object to the first object. According to this aspect of the invention, response data may be generated at the second object. A request may also be generated by the second object to transmit the data to the first object. In response to the request, an IM may be transmitted to the IM server computer that includes the response data. The message may be transmitted to the IM server computer utilizing an IM protocol, such as the MSNP protocol, the RVP protocol, or the SIP protocol.

The IM may then be received at the IM server computer and forwarded to the first object. When the IM is received at the managed code environment in which the first object is executing, the response data may be extracted from the IM and presented to the first object. The data and response data may be formatted as extensible markup language ("XML") data formatted according to the simple object access protocol ("SOAP") or using binary a formatter or a custom formatter as the developer deems appropriate. According to other aspects of the method, the IM server computer may authenticate the first object and the second object prior to permitting the exchange of messages between the first and second objects. Moreover, the IM server computer may also automatically generate a log of messages transmitted between the first object and the second object.

According to another aspect of the invention, a system is provided for establishing an instant messaging communications channel for communication between objects executing within a managed code environment. The system includes an object executing within a managed code environment operative to request the transmission of data to a second object. The system also includes a remotting system executing within the managed code environment operative to receive the request from the object and, in response to the request, to transmit an IM including the data to an IM server computer. The IM may be transmitted to the IM server computer using an IM protocol, such as the MSNP protocol, the RVP protocol, or the SIP protocol.

According to other aspects of the invention, the system may include an IM server computer operative to authenticate messages received from the first and second objects and to log the exchange of messages between the objects. Moreover, the IM server computer may be further operative to receive the IM from the remotting system and to forward the IM to a remoting system executing within a managed code environment within which the second object is executing. The remoting system may extract the data from the IM and pass the data to the second object. The IM server computer may also receive an IM containing response data from the second object. In response thereto, the IM server computer is further operative to forward the IM to the remotting system executing within the managed code environment in which the first object is executing.

The invention may be implemented as a computer process, a computing system, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
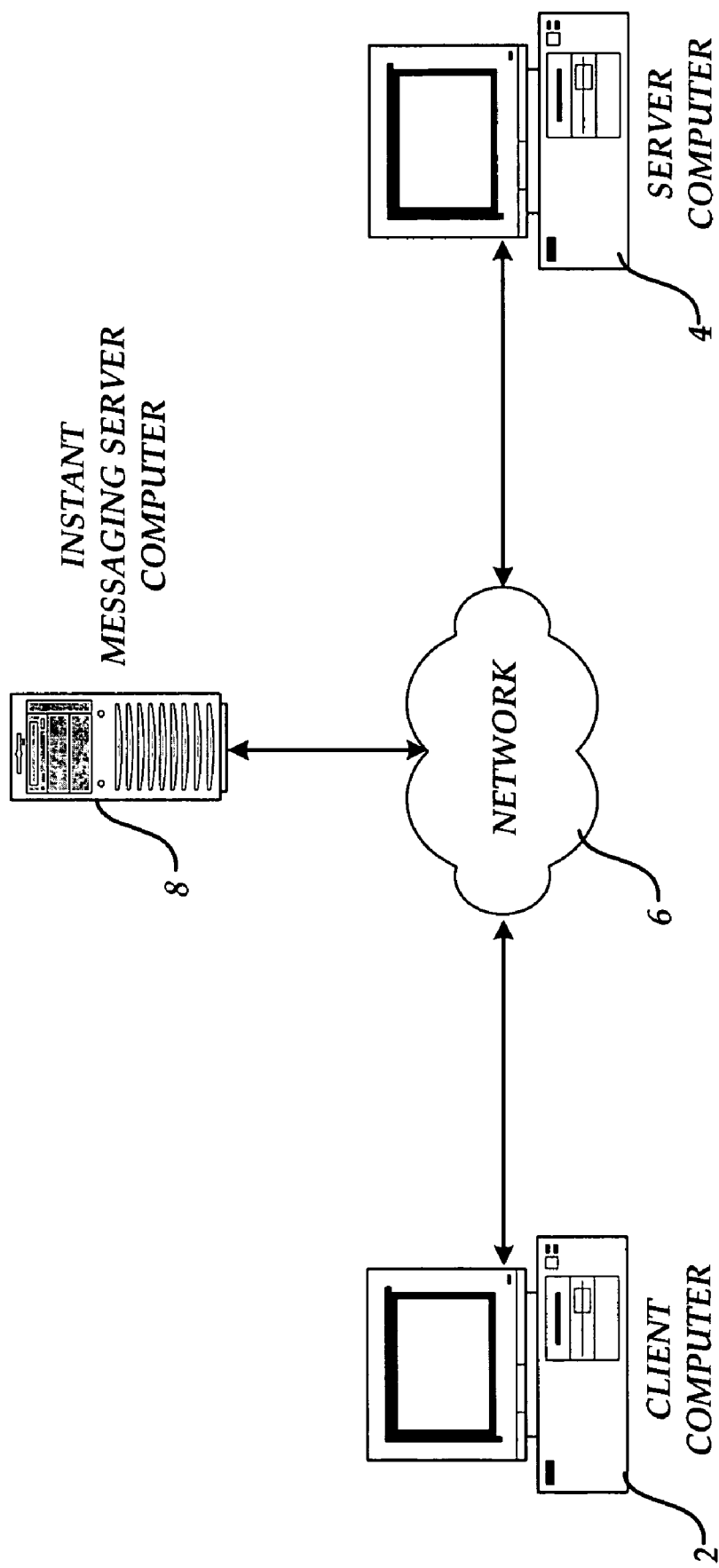
FIG. 1 is a network architecture diagram showing an illustrative operating environment for the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, a number of network components utilized in the various embodiments of the invention will be described. As shown in FIG. 1, a client computer 2 and a server computer 4 may be connected to the Internet or other type of network 6. An IM server computer 8 may also be accessible through the network 6. As will be described in greater detail below, the client computer 2 and the server computer 4 are operative to execute a managed code environment, such as the MICROSOFT .NET PLATFORM, in which distributed objects may be executed. Moreover, the client computer 2 and the server computer 4 are operative to provide an inter-object communications channel via the IM server computer 8.

In order to provide the IM communications channel, the client computer 2 and the server computer 4 include program code for supporting the use of an instant messaging protocol to communicate with the IM server computer 8. For instance, IM protocols such as the MICROSOFT NETWORK PROTOCOL ("MSNP"), the MICROSOFT EXCHANGE SERVER-compatible RVP protocol ("RVP"), or the session initiation protocol ("SIP") may be utilized for communicating with the IM server computer 8. In particular, the client computer 2 and the server computer 4 may register with the IM server computer 8 as a user of an instant messaging service. Once the client computer 2 and the server computer 4 have registered and been authenticated by the IM server computer 8, instant messages containing data intended for remote objects may then be transmitted to the IM server computer 6 utilizing the SIP protocol or other similar protocols for the exchange of instant messages. Additional details regarding the exchange of such messages through the IM server computer 8 will be provided below.

In order to provide the above-described functionality, the IM server computer 8 is operative to execute an IM server application program that facilitates the exchange of messages between instant messaging users. In this regard, the IM server computer 8 is operative to maintain an IM database (not shown in FIG. 1). Among other things, the IM database includes the identities of users authorized to utilize the IM server computer 8 and a log of messages between the users of the IM server computer 8. Additional details regarding the operation of the IM server computer 8 will be provided below.

Figure 2:
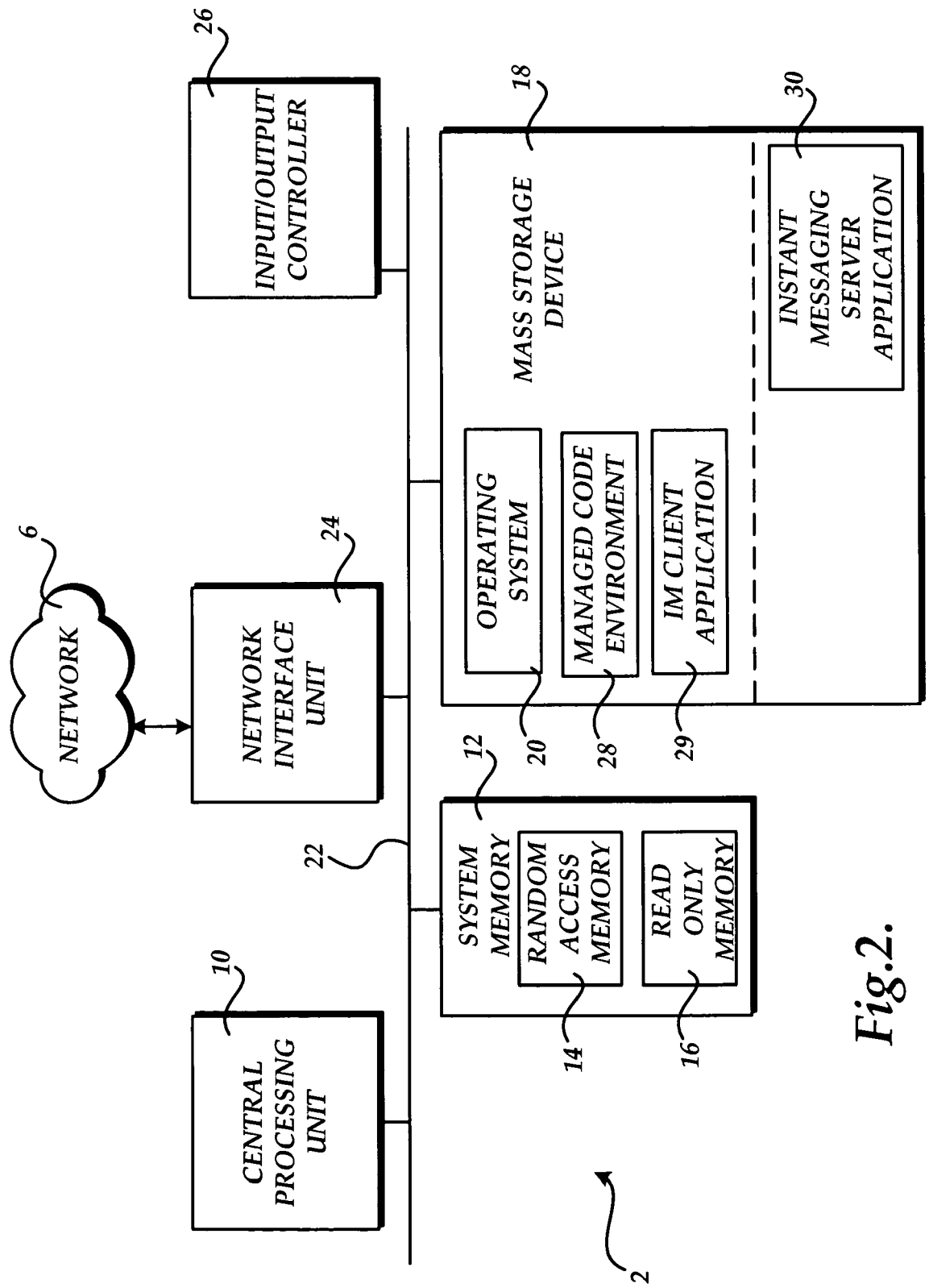
FIG. 2 is a computer architecture diagram showing an illustrative computer hardware and software architecture utilized by various computing systems in the embodiments of the invention.

Referring now to FIG. 2, an illustrative computer architecture for a client computer 2 utilized in the various embodiments of the invention will be described. The computer architecture shown in FIG. 1 illustrates a conventional desktop or laptop computer, including a central processing unit 10 ("CPU"), a system memory 12, including a random access memory 14 ("RAM") and a read-only memory ("ROM") 16, and a system bus 22 that couples the memory to the CPU 10. A basic input/output system containing the basic routines that help to transfer information between elements within the computer, such as during startup, is stored in the ROM 16. The client computer 2 further includes a mass storage device 18 for storing an operating system 20, application programs, and other program modules, which will be described in greater detail below.

The mass storage device 18 is connected to the CPU 10 through a mass storage controller (not shown) connected to the bus 22. The mass storage device 18 and its associated computer-readable media provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the client computer 2 may operate in a networked environment using logical connections to remote computers through a network 6, such as the Internet. The computer 2 may connect to the network 6 through a network interface unit 24 connected to the bus 22. It should be appreciated that the network interface unit 24 may also be utilized to connect to other types of networks and remote computer systems. The computer 2 may also include an input/output controller 26 for receiving and processing input from a number of other devices, including a keyboard, mouse, or electronic stylus (not shown in FIG. 1). Similarly, an input/output controller 26 may provide output to a display screen, a printer, or other type of output device.

As mentioned briefly above, a number of program modules and data files may be stored in the mass storage device 18 and RAM 14 of the client computer 2, including an operating system 20 suitable for controlling the operation of a networked computer, such as the WINDOWS XP operating system from MICROSOFT CORPORATION of Redmond, Wash. The mass storage device 18 and RAM 14 may also store one or more program modules. In particular, the mass storage device 18 and the RAM 14 may store an IM client application 29 for communicating with the IM server computer 8. As known to those skilled in the art, the IM client application 29 allows a user of the client computer 2 to exchange messages with another instant messaging user in near real time. According to the embodiments of the invention, the IM client application 29 also exposes functionality for communicating with the IM server computer 8 to other applications. This functionality may be utilized by other applications to transmit messages to the IM server computer 8 for inter-object communication as described herein.

The mass storage device 18 and the RAM 14 may also store program code for providing a managed code environment 28. One example of a managed code environment 28 is the MICROSOFT NET PLATFORM from MICROSOFT CORPORATION of Redmond, Wash. The MICROSOFT NET PLATFORM is an application programming and execution platform that provides write-once, compile-once, run-anywhere application development. MICROSOFT NET PLATFORM applications may be created in any language as long as they are compiled by a compiler that targets the MICROSOFT NET PLATFORM universal runtime ("URT"), also known as the common language runtime ("CLR") engine. Such a compiler compiles .NET applications into intermediate language ("IL"), rather than directly into executable code. IL is a platform-independent and central processing unit ("CPU")-independent intermediate language. IL is a much higher level language than most CPU machine languages.

To execute a .NET platform application, the compiled IL is interpreted, or "just-in-time" compiled, by the URT into native machine instructions. The native machine instructions can then be directly executed by the CPU. Because IL is CPU-independent, IL can execute on any CPU platform as long as the operating system running on that CPU platform hosts the MICROSOFT .NET PLATFORM URT. Applications compiled into IL need the URT to execute, and are called "managed code" applications. By contrast, code that does not need the CLR to execute, such as today's WIN32 applications, are called "native code" applications.

The MICROSOFT NET PLATFORM also includes a base library that comprises a large set of class libraries and services. These libraries and services provide access to the features of the URT, and other high-level services, so that software developers do not have to code the same services repeatedly. For instance, classes may be offered to expose hypertext transfer protocol ("HTTP") clients and servers, generic containers like arrays and dictionaries, and other types of classes previously available only through language-specific extensions. In the embodiments described herein, classes may be exposed for provided inter-object communication via an IM communications channel.

The MICROSOFT NET PLATFORM also provides technologies to support rapid software development. For instance, in the MICROSOFT NET PLATFORM, all application services are offered via a common object-oriented programming model. This is unlike previous development and execution environments where some operating system facilities are accessed via dynamically linked library ("DLL") functions and other facilities are accessed via component object model ("COM") objects. Moreover, the MICROSOFT NET PLATFORM provides consistency in error-handling. When programming applications for execution on the MICROSOFT WINDOWS XP operating system in a traditional fashion, some functions report Win32 error codes, some return HRESULTS, and some raise exceptions. In the MICROSOFT NET PLATFORM, all errors are reported via exceptions. This greatly simplifies reading, writing, and maintaining code. Additional details regarding the architecture and use of the managed code environment 28 will be provided below with respect to FIG. 3.

It should be appreciated that the server computer 8 may be configured in an identical manner to the client computer 2, including the managed code environment 28. In fact, it should be appreciated that the terms "client" and "server" are used herein only for convenience and that the client computer 2 may operate as a server computer and that the server computer 8 may operate as a client computer. It should also be appreciated that the IM server computer 8 may include some or all of the conventional components illustrated in FIG. 2 and described above with respect to the client computer 2. Additionally, the IM server computer 6 may execute an IM server application 30. In one embodiment, the IM server application 30 comprises the LIVE COMMUNICATIONS SERVER from MICROSOFT CORPORATION. It should be appreciated that other instant messaging server applications may be utilized.

Figure 3:
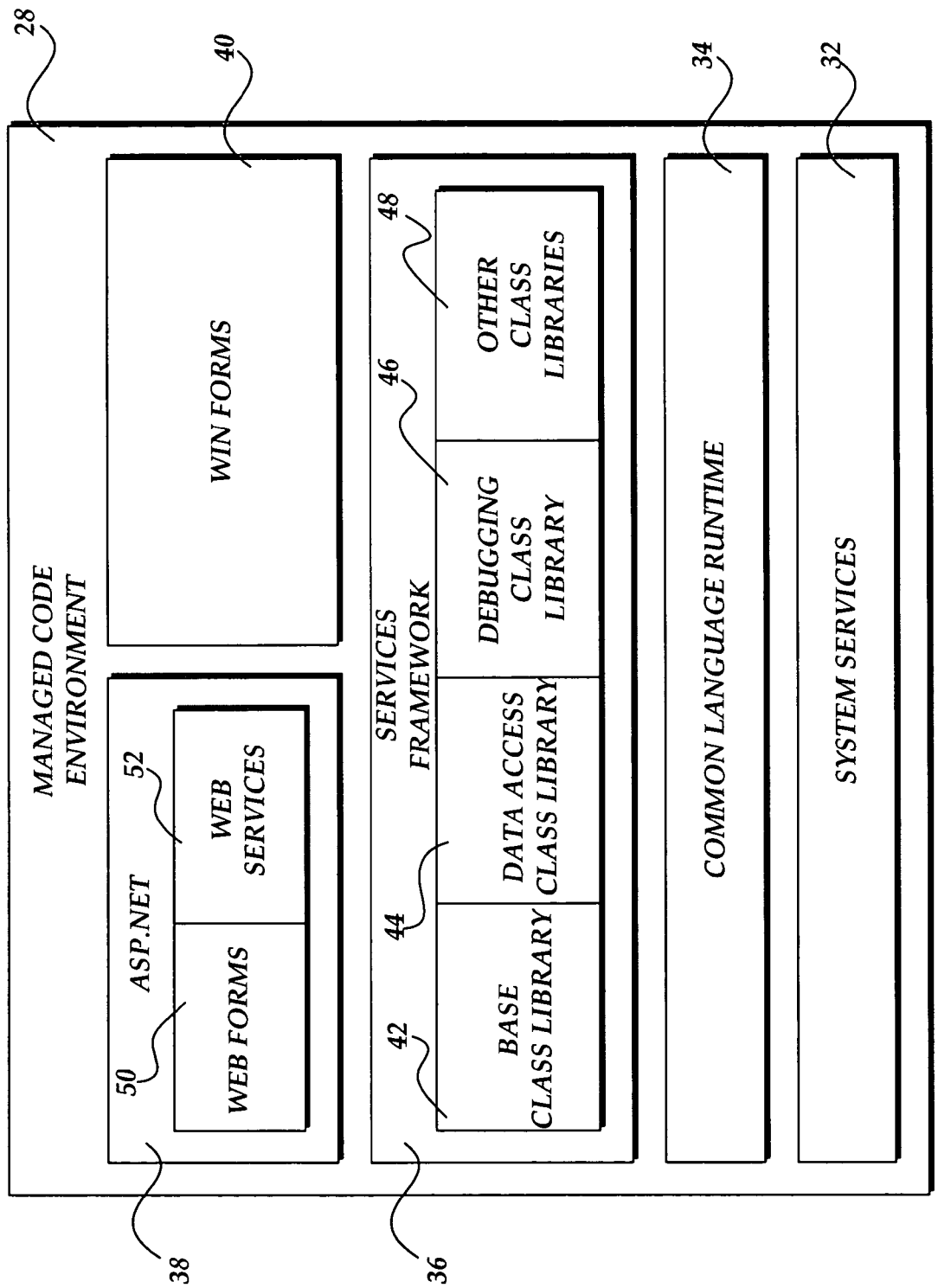
FIG. 3 is a software architecture diagram illustrating the architecture of a managed code environment utilized in embodiments of the invention.

Referring now to FIG. 3, an illustrative managed code environment 28 will be described. As mentioned briefly above, the managed code environment 28 comprises an application development and execution environment that provides facilities to make the development and execution of distributed applications and services much easier. In the actual embodiment of the present invention described herein, the managed code environment 28 comprises the MICROSOFT .NET PLATFORM, which will be described in detail below. Those skilled in the art should appreciate that while the present invention is described herein as executing on the MICROSOFT .NET PLATFORM, the present invention may also be utilized in connection with other types of managed code environments that utilize an interpreter, or "just-in-time" compiler to execute applications. For instance, the present invention may be utilized in connection with a Java® virtual machine from Sun Microsystems.

According to the actual embodiment of the present invention described herein, the managed code environment 28 comprises operating system services 32, a CLR 34, a services framework 36, and one or more application models, such as the active server pages plus ("ASP.NET") application model 38 and the Win forms application model 40. Each of the components of the managed code environment 24 is described in detail below.

At the lowest level of the managed code environment 28 resides operating system services 32. As known to those skilled in the art, an operating system may provide a number of services such as memory management and hardware support through device drivers, and other types of services. These operating system services 32 are exposed to the managed code environment 28 through APIs, DLLs, or through other means known to those skilled in the art.

Built on top of the operating system services 32 is a CLR 34 that loads and executes code written in any runtime-aware programming language. Code that targets the runtime 34 is called managed code. Managed code means that there is a defined contract of operation between executing code and the runtime 34. Responsibility for tasks like creating objects, making method calls, and so on is delegated to the runtime 34, which enables the runtime 34 to provide additional services to the executing code.

The runtime 34 makes use of a common type system capable of expressing the semantics of most modern programming languages. The common type system defines a standard set of types and rules for creating new types. The runtime 34 understands how to create and execute these types. Compilers and interpreters use runtime 34 services to define types, manage objects, and make method calls instead of using tool- or language-specific methods.

A primary design goal for the type system of the runtime 34 is to enable deep multi-language integration. Using the runtime 34, code written in one language can inherit implementation from classes written in another language; exceptions can be thrown from code written in one language and caught by code written in another; and operations such as debugging and profiling work seamlessly regardless of the language used to write the code. The means that developers of reusable class libraries no longer need to create versions for each programming language or compiler, and developers using class libraries are no longer limited to libraries for the programming language they are using.

The runtime 34 also supplies integrated, pervasive security services to ensure that unauthorized users cannot access resources on a machine and that code cannot perform unauthorized actions. This improves overall system safety and reliability. Since the runtime 34 is used to load code, create objects, and make method calls, the runtime 34 can perform security checks and enforce security policy as managed code is loaded and executed. In this regard, the runtime 34 supports code access security and role-access security.

With code access security, developers can specify the required permissions their code requires. For example, code may need permission to write a file or access environment variables. At load time and on method calls, the runtime 34 verifies that the code can be granted the permissions it has asked for. If not, a security violation is reported.

Role-based security builds on the same permissions model as code access security, except that the permissions are based on user identity rather than code identity. Roles represent categories of users and can be defined at development or deployment time. Policies for granting permissions are assigned to each defined role. At run time, the identity of the user on whose behalf the code is running is determined. The runtime 34 determines what roles the user is a member of and then grants permissions based on those roles.

A services framework 36 resides on top of the runtime 34. The services framework 36 provides classes that can be called from any modern programming language. In particular, the services framework 36 includes a base class library 44, a data access class library 46, and a debugging class library 48. The base class library 44 includes a set of class libraries that developers would expect in a standard language library, such as collections, input/output, string, and numerical classes. In addition, the base class library 42 provides classes to access operating system services 32, such as graphics, networking, threading, globalization, and cryptography. The data access class library 44 provides classes for connecting to, issuing commands against, and retrieving results from data stores. Other class libraries 48 may also be provided. In particular, other class libraries 48 may be provided for providing remoting services between applications executing within the .NET PLATFORM. These classes promote optimized, effective communication between applications executing in the managed code environment. It should also be appreciated that each of these class libraries complies with a set of naming and design guidelines to further reduce the learning curve for developers. Additional details regarding the class libraries for providing remoting services within the managed code environment are provided below with respect to FIGS. 4-6.

Conceptually, on top of the services framework 36, sit two application models: the ASP.NET application model 38 and the Win forms application model 40. Developers writing client applications for the MICROSOFT WINDOWS XP operating system can use the Win forms application model 40 to take advantage of the rich user interface features of the MICROSOFT WINDOWS XP operating system, including existing ActiveX controls and transparent, layered, and floating windows.

The ASP.NET application model 38 takes advantage of the CLR 34 and the services framework 36 to provide a reliable, robust, scalable hosting environment for distributed applications. To provide such functionality, the ASP.NET application model 38 includes forms 50 that are responsible for generating a user interface, typically in the form of hyper-text markup language ("HTML"). The ASP.NET application model 38 comes with a set of Web forms 50 that mirror typical HTML user interface widgets (including list boxes, text boxes, and buttons), and an additional set of Web controls that are more complex (such as calendars and advertising rotators). The ASP.NET application model also includes Web services 52 that provide a high-level programming model for building Web services with ASP.NET.

Figure 4:
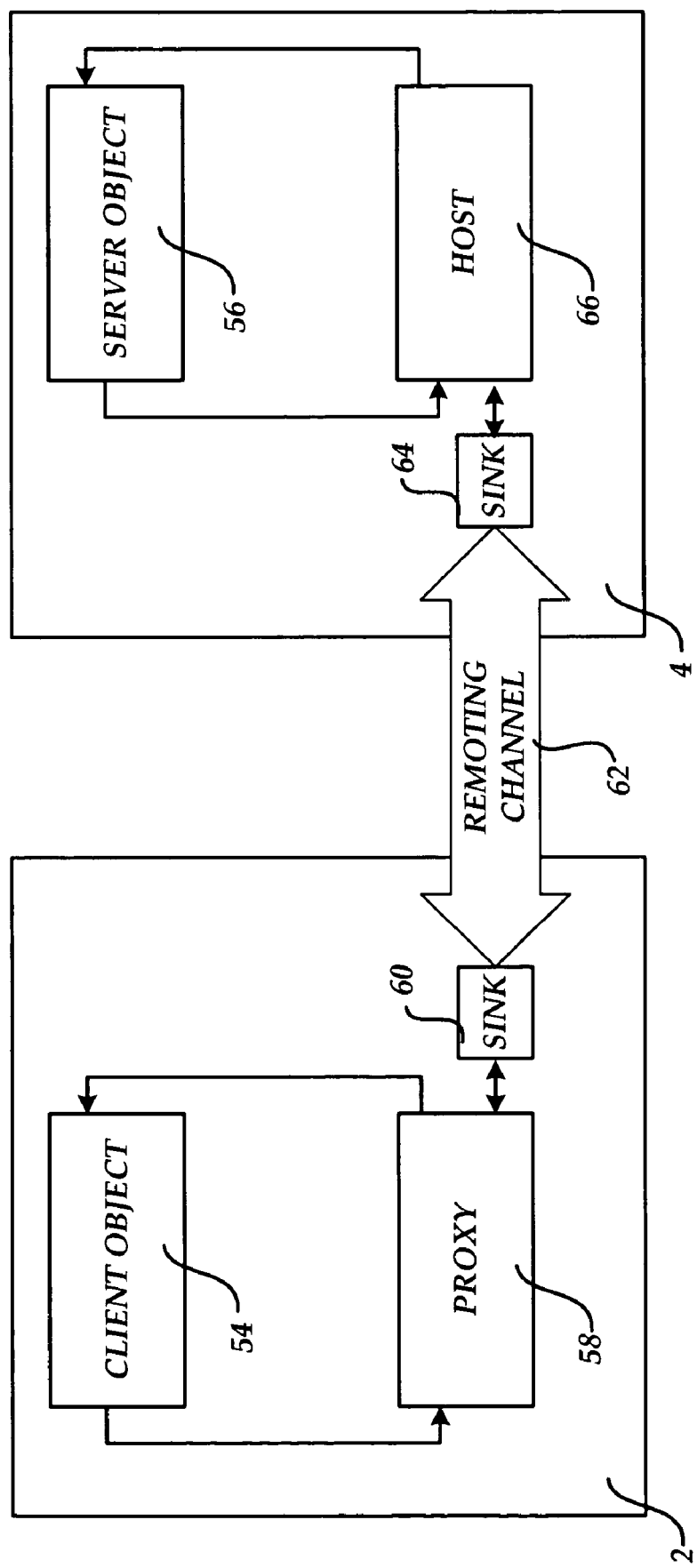
FIG. 4 is a software architecture diagram showing aspects of a remoting system provided by the managed code environment in embodiments of the invention.

As described briefly above, class libraries are provided by the MICROSOFT .NET PLATFORM for providing remoting services between applications executing within the NET PLATFORM. FIG. 4 illustrates the architecture for providing remoting services within the NET PLATFORM. In should be appreciated that the entire set of services that enable managed code applications to communicate with each other fall under the umbrella of "remoting." Such applications can reside on the same computer, work on different computers in the same local area network, and even be scattered across the world in homogeneous networks and platforms. Remoting within the managed code environment is also a suitable tool for accessing objects executing in different application domains ("AppDomains") or processes. The only requirement is that each of the disparate computers host the managed code environment.

As shown in FIG. 4, a client object 54 may execute within the managed code environment on the client computer 2. A server object 56 may similarly execute within a managed code environment on the server computer 4. However, it should be appreciated that, according to various embodiments of the invention, the client object 54 and the server object 56 may also be executed within the same managed code environment on the same computer.

When the client object 54 desires to communicate with a remote server object 56, a proxy 58 is created by the remoting system of the managed code environment executing on the client computer 2. The proxy 58 represents the remote object to the client and mirrors the same set of properties and methods available on the server object 56. Each client invocation of a remote method actually accesses the local proxy which, in turn, takes care of routing the call to the appropriate sink 60. In particular, each method invocation originates a message that travels on top of a channel 62 and a transmission protocol. Each message passes through a chain of sinks on each side of the transport channel. For instance, when a message is transmitted from the client object 54 to the server object 56, the message is transmitted over the remoting channel 62, received and processed by one or more sinks 64 on the server computer 4, routed through the host 66 and, ultimately, delivered to the server object 56. Return data from the server object 56 to the client object 54 may be routed in the reverse order in a similar manner.

A channel 62 is the element in the managed code remoting architecture that physically moves bytes from one endpoint to the other. The channel 62 takes a stream of bytes, creates a package according to a particular protocol, and routes it to the final destination across remoting boundaries. As discussed briefly above, a channel can connect two objects executing on the same machine as well as two machines over a wide area network. A channel object listens for incoming messages and sends outbound messages. In both cases, the messages it handles can be made of packets written for a variety of protocols. In programming terms, a channel is a NET class that implements the IChannel interface. The channel object is also required to implement IChannelReceiver and IChannelSender if it is expected to act as a receiver and/or a sender.

The MICROSOFT NET PLATFORM comes with two predefined channel classes, TcpChannel and HttpChannel, both of which work as senders and receivers. TcpChannel uses a binary formatter to serialize data to a binary stream and transport it to the target object using the TCP protocol. HttpChannel transports messages to and from remote objects using the SOAP protocol. The server object publishes the list of supported channels and, based on this list, the client decides how to actually perform the call. Servers must register at least one channel. The embodiments of the invention described herein provide an additional channel class for utilizing an instant messaging channel to route data between distributed objects as both a sender and a receiver. Additional details regarding the operation of this channel class will be provided below with reference to FIGS. 5 and 6.

Figure 5:
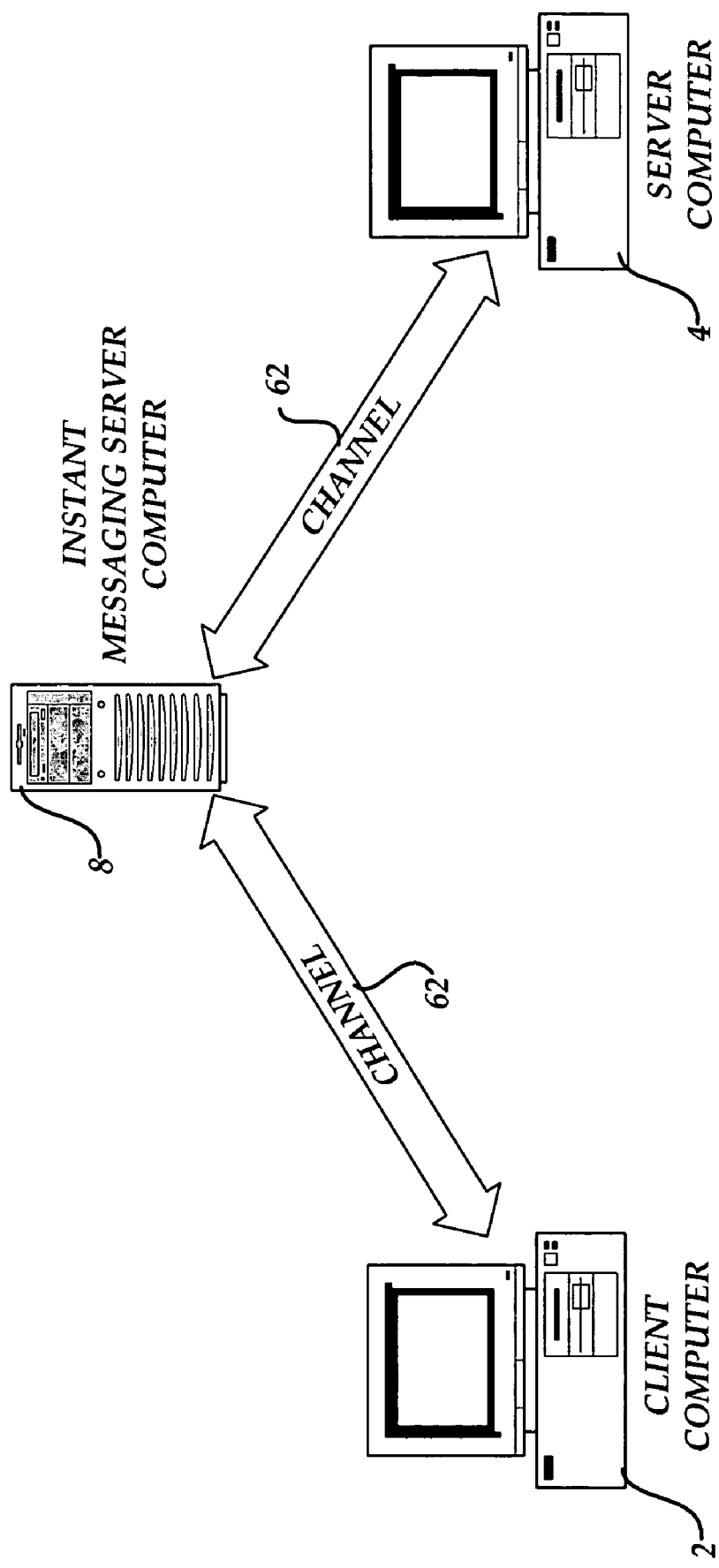
FIG. 5 is a network diagram showing aspects of a instant messaging communications channel for transmitting remoting requests according to an embodiment of the invention.

Turning now to FIG. 5, additional details regarding the operation of the IM communications channel for inter-object communication will be described. As shown in FIG. 5, the embodiments of the invention provide a communications channel 62 between objects executing on the client computer 2 and the server computer 4 that utilizes the IM server computer 8. In particular, when a request is made at the client computer 2 to communicate with an object executing on the server computer 4, the channel 62 may be utilized. The data intended for the object executing on the server computer 4 may be formatted and transmitted in an instant message to the IM server computer 8. According to embodiments of the invention, the data may be formatted as XML according to the SOAP protocol. Alternatively, the data may be formatted as binary data. The MICROSOFT NET FRAMEWORK includes both a SOAP and binary data formatter.

The IM server computer 8 is responsible for authenticating both the sender and the recipient of such messages. If authentication can be performed, the IM server computer is operative to route the IM to the server computer 4. At the server computer 4, the IM is received by the remoting host and the data contained therein is extracted. The data may then be delivered to the destination object executing on the server computer 4. It should be appreciated that return data may be transmitted from the server computer 4 to the client computer 2 in a similar fashion.

Figure 6:
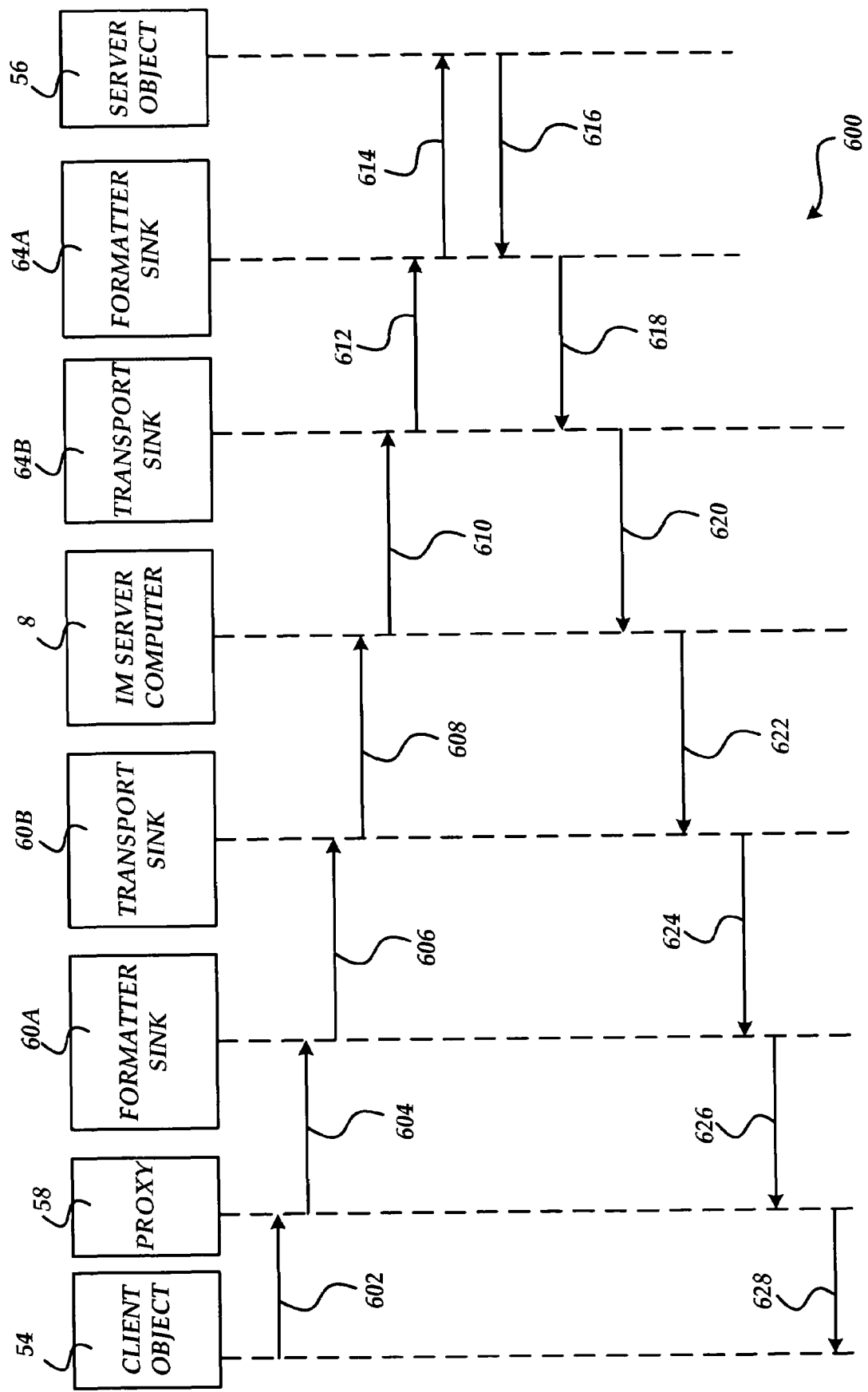
FIG. 6 is a flow diagram illustrating a process for providing an instant messaging communications channel for routing remoting data from within a managed code environment according to one embodiment of the present invention.

Referring now to FIG. 6, an illustrative process 600 will be described illustrating the transmission of data from a first object to a second object and the transmissions of data from the second object to the first object utilizing the improved communications channel provided herein. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 6, and making up the embodiments of the present invention described herein, are referred to variously as operations, structural devices, acts or modules.

It will be recognized by one skilled in the art that these operations, structural devices, acts and modules may be implemented in software, in firmware, in special purpose digital logic, and any combination thereof without deviating from the spirit and scope of the present invention as received within the claims attached hereto.

The process 600 illustrated in FIG. 6 begins at operation 54, where the client object 54 makes a request to transmit data to the server object 56. In response thereto, the remoting system creates the proxy 58. At operation 604, the data to be transmitted to the server object 56 is routed to a formatter sink 60A. As discussed above, the formatter sink 60A formats the data in a particular manner. For instance, the data may be formatted as XML utilizing the SOAP protocol or may be formatted as binary data.

Once the data has been formatted by the formatter sink 60A, the data is passed to the transport sink 60B at operation 606. As discussed above, the transport sink 60B is operative to place the formatted data on the appropriate channel. In this case, the channel comprises the IM communications channel. Accordingly, at operation 608, the transport sink 60B transmits the formatted data to the IM server computer 8 utilizing an IM protocol such as MSNP, RVP, or SIP.

At the IM server computer 8, the client object 54 and the server object 56 are authenticated. Additionally, one or more entries may be made in a log maintained by the IM server computer 8 identifying the message exchange. Once the communication has been logged and the recipient has been authenticated, the IM server computer 8 is operative to route the IM to the transport sink 64B executing on the server computer 4 at operation 610. The transport sink 64B routes the message to the formatter sink 64A at operation 612, which extracts the data from the message. The formatter sink 64A then passes the extracted data to the server object 56 at operation 614.

As discussed briefly above, response data generated by the server object 56 may be returned to the client object 54 in a similar manner. In particular, the server object 56 may make a request to transmit response data to the client object 54. In response thereto, the remoting system creates a proxy on the server computer. At operation 616, the response data to be transmitted to the client object 54 is routed to the formatter sink 64A. Once the data has been formatted by the formatter sink 64A, the data is passed to the transport sink 64B at operation 618. The transport sink 64B transmits the formatted data to the IM server computer 8 utilizing an IM protocol such as MSNP, RVP, or SIP.

Once the communication has been logged and the recipient has been authenticated, the IM server computer 8 is operative to route the IM to the transport sink 60B executing on the client computer 2 at operation 622. The transport sink 60B routes the message to the formatter sink 60A at operation 624, which extracts the data from the message. The formatter sink 60A then passes the extracted data to the proxy 58 at operation 626. The response data is then returned to the client object 54 at operation 628.

Based on the foregoing, it should be appreciated that the various embodiments of the invention include a method, system, apparatus, and computer-readable medium for providing a communications channel for inter-object communication are provided. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing an instant messaging communications channel for communication between objects executing within a managed code environment, the method comprising:
   registering a first object and a second object as users of an instant messaging server computer;
   receiving a request from a first object executing within a managed code environment to transmit data to a second object also executing within a managed code environment;
   in response to the request, transmitting an instant message including the data to the instant messaging server computer, the message being transmitting utilizing one of the MSNP protocol, the RVP protocol, or the SIP protocol;
   receiving the instant message at the instant messaging server computer,
   authenticating the first object and the second object as registered users of the instant messaging server computer prior to forwarding the instant message to the second object; and
   receiving the instant message, extracting the data from the instant message, and presenting the data to the second object.

2. The method of claim 1, further comprising:
   generating response data at the second object;
   receiving a request to transmit the response data from the second object to the first object;
   in response to the request, transmitting an instant message including the response data to the instant messaging server computer, the message being transmitting utilizing one of the MSNP protocol, the RVP protocol, or the SIP protocol;
   receiving the instant message at the instant messaging server computer, and forwarding the instant message to the first object; and
   receiving the instant message, extracting the data from the instant message, and presenting the data to the first object.

3. The method of claim 2, wherein the first object is operative to execute within a managed code environment executing on a first computer and wherein the second object is operative to execute within a managed code environment executing on a second computer.

4. The method of claim 3, wherein the first and second computers are remotely located from one another.

5. The method of claim 1, wherein the first object and the second object are operative to execute within a managed code environment executing on a first computer.

6. The method of claim 4, wherein the instant message comprises a payload containing the data and wherein the payload comprises extensible markup language data formatted according to the simple object access protocol.

7. The method of claim 1, wherein the instant messaging server computer is further operative to generate a log of messages transmitted between the first object and the second object.

8. A computer-readable medium having computer-executable instructions stored thereon which, when executed by a computer, will cause the computer to perform the method of claim 1.

9. A computer-controlled apparatus capable of performing the method of claim 1.

10. A system for providing an instant messaging communications channel for communication between objects executing within a managed code environment, the system comprising:

an object executing within a managed code environment registered as a user of an instant messaging server computer operative to request the transmission of data to a second object, wherein the second object is a registered user of the instant messaging server computer; and a remoting system executing within the managed code environment operative to receive the request from the object and, in response to the request, to transmit an instant message including the data to the instant messaging server computer, the message being transmitting utilizing one of the MSNP protocol, the RVP protocol, or the SIP protocol, wherein the instant messaging server computer is configured to register the object and the second object and authenticate the object and the second object prior to accepting the instant message transmitted by the remoting system.

11. The system of claim 10, further comprising an instant messaging server computer operative to receive the instant message from the remoting system and to forward the instant message to a remoting system executing within a managed code environment within which the second object is executing.

12. The system of claim 11, wherein the instant messaging server computer is further operative to generate a log of messages transmitted between the first object and the second object.

13. The system of claim 12, wherein the instant messaging server computer is further operative to receive an instant message containing response data from the second object, the instant message being transmitting utilizing one of the MSNP protocol, the RVP protocol, or the SIP protocol, and wherein the instant messaging server computer is further operative to forward the instant message to the remoting system executing within the managed code environment in which the first object is executing.

14. The system of claim 13, wherein the first object is operative to execute within a managed code environment executing on a first computer and wherein the second object is operative to execute within a managed code environment executing on a second computer.

15. The system of claim 14, wherein the first and second computers are remotely located from one another.

16. The system of claim 13, wherein the first object and the second object are operative to execute within a managed code environment executing on a first computer.

17. A computer-readable medium having computer-executable instructions stored thereon which, when executed by a computer, will cause the computer to:

register a first object and a second object with an instant messaging server computer, wherein the first object is operative to execute within a managed code environment executing on a first computer and wherein the second object is operative to execute within a managed code environment executing on a second computer;

establish, with the first object, a proxy representing a plurality of methods and properties available to the second object;

receive a request from the first object executing within a managed code environment to transmit data to the second object also executing within a managed code environment;

in response to the request, transmit an instant message including the data to the instant messaging server computer, the message being transmitting utilizing one of the MSNP protocol, the RVP protocol, or the SIP protocol, wherein the instant message comprises a payload containing the data and wherein the payload comprises extensible markup language data formatted according to the simple object access protocol;

receive the instant message at the instant messaging server computer;

authenticate the first object and the second object as being registered with the instant messaging server computer; and forward the instant message to the second object.

* * * * *